US 7,139,165 B2

(12) United States Patent
Sharma et al.

(10) Patent No.: US 7,139,165 B2
(45) Date of Patent: Nov. 21, 2006

(54) COMPUTER SYSTEM HAVING A LOCAL OR REMOTE LOW-VOLTAGE POWER BUTTON

(75) Inventors: Pankaj Sharma, Cypress, TX (US); Steven B. Williamson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 10/769,249

(22) Filed: Jan. 30, 2004

(65) Prior Publication Data

US 2005/0168936 A1    Aug. 4, 2005

(51) Int. Cl.
*G06F 1/16* (2006.01)
(52) U.S. Cl. .................. 361/683; 361/679; 361/114
(58) Field of Classification Search ............... 361/114, 361/115, 679, 683, 686
See application file for complete search history.

(56) References Cited

U.S. PATENT DOCUMENTS 6,477,588 B1 * 11/2002 Yerazunis et al. ............ 710/13
6,525,926 B1 *  2/2003 Chen .......................... 361/683

* cited by examiner

*Primary Examiner*—Yean-Hsi Chang
(74) *Attorney, Agent, or Firm*—Kevin M. Hart

(57) ABSTRACT

A computer system according to a preferred embodiment of the invention may have either a local or a remote low-voltage power button. The arrangement is freely reconfigurable by the end user. A socket or plug is accessible from the exterior of the enclosure of a main unit. On the inside of the enclosure, the socket or plug is coupled to circuitry for sensing activity in a power button. The socket or plug is adapted to removably mate with a corresponding socket or plug on either a low-voltage power button or a low-voltage power button extender assembly. The low-voltage power button may comprise simply a switch integrated with a socket or plug. The low-voltage power button extender assembly may comprise a switch coupled to a socket or plug by means of a flexible cable.

11 Claims, 2 Drawing Sheets

COMPUTER SYSTEM HAVING A LOCAL OR REMOTE LOW-VOLTAGE POWER BUTTON

FIELD OF THE INVENTION

This invention relates generally to on/off switches and power buttons for computers.

BACKGROUND

Virtually all computers include a low-voltage on/off switch or power button (hereinafter "power button" or "button") configured so that a human user may manually activate the button to change the state of the computer from off to on or vice versa. In the vast majority of computers, the button is permanently mounted to the computer's enclosure at or near its exterior. For example, a very common configuration for desk-top and tower computers is shown schematically in FIG. 1. In the configuration of FIG. 1, a power button 100 is located on the front chassis wall or bezel 102 of an enclosure 104. Button 100 is directly coupled to the motherboard 106 by means of a 2-conductor cable 108. Motherboard 106, in turn, is connected to a DC supply output 110 of a power supply 112, which receives its power from an AC supply 114. Typically, sensing circuitry on motherboard 106 detects activity in power button 100 and causes the computer system to power up or down depending on its previous state.

Unfortunately, any such configuration wherein the power button is permanently mounted to the enclosure imposes constraints on where the computer may be located and how it may be oriented. In short, most prior art designs require that the enclosure be located and oriented such that the power button remains accessible to the user at all times. This makes it very inconvenient to deploy a prior art computer for applications requiring the computer to be located in an "out-of-the-way" location such as in a point-of-sale environment. On the other hand, such prior art designs are convenient when the computer is used in traditional desk-top or desk-side locations.

One or more "Macintosh" models from Apple Computer, Inc., provided a power button 200 that was permanently integrated with the computer's keyboard 202, as shown in FIG. 2. Signals describing activity on button 200 were relayed to circuitry within the computer's enclosure 204 by means of the keyboard's universal serial bus ("USB") interface. The USB interface included a flexible cable 206 and a USB connector 208 designed to mate with a corresponding USB socket mounted to enclosure 204. While this configuration provided some flexibility regarding the location of the power button, in every case the button necessarily had to be co-located with the keyboard because the button was permanently integrated therein.

SUMMARY OF THE INVENTION

A computer system according to a preferred embodiment of the invention may have either a local or a remote low-voltage power button. Moreover, the arrangement is freely reconfigurable by the end user.

In one aspect, a socket or plug is accessible from the exterior of the enclosure of the computer system's main unit. On the inside of the enclosure, the socket or plug is coupled to circuitry for sensing activity in a power button. The socket or plug is adapted to removably mate with a corresponding socket or plug on either a low-voltage power button or on a low-voltage power button extender assembly. The low-voltage power button may comprise simply a switch integrated with a socket or plug. The low-voltage power button extender assembly may comprise a switch coupled to a socket or plug by means of a flexible cable.

In a further aspect, the low-voltage power button or the low-voltage power button extender assembly may include an indicator light, such as a light-emitting diode, for indicating the current power state of the computer.

DETAILED DESCRIPTION OF THE PREFERRED EMBODIMENTS

Figure 3:
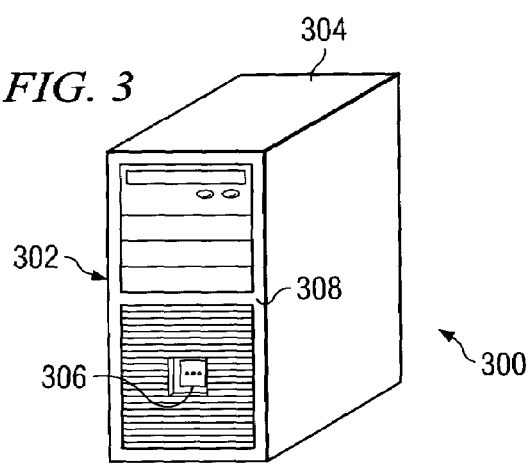
FIG. 3 is an oblique view of a reconfigurable computer system adapted to receive either a low-voltage power button or a low-voltage power button extender assembly according to a preferred embodiment of the invention.

FIG. 3 illustrates a computer system 300 having a local or remote low-voltage power button according to a preferred embodiment of the invention. Computer system 300 includes a main unit 302 having an enclosure 304. Within enclosure 304, main unit 302 houses circuitry for sensing activity in a low-voltage power button. The sensing circuitry may be constructed using any suitable technique including those of the prior art as discussed above. Main unit 302 may be constructed according to any style, orientation or form factor now known or yet to be developed. For example, main unit 302 may be a desk-top style or tower-style or other-style main unit without limitation.

Figure 4:
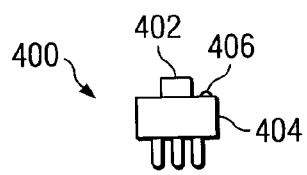
FIG. 4 is a side view of a low-voltage power button adapted to removably mate with the computer system of FIG. 3 according to a preferred embodiment of the invention.
Figure 5:
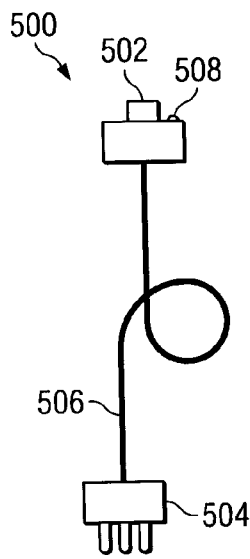
FIG. 5 is a side view of a low-voltage power button extender assembly adapted to removably mate with the computer system of FIG. 3 according to a preferred embodiment of the invention.

Main unit 302 includes a socket or plug 306 that is accessible from the exterior of enclosure 304. Inside enclosure 304, socket or plug 306 is electrically coupled to the circuitry for sensing activity in a low-voltage power button. Socket or plug 306 is adapted to removably mate with a corresponding socket or plug of either a low-voltage power button such as that shown in FIG. 4, or a low-voltage power button extender assembly such as that shown in FIG. 5.

Low-voltage power button 400 includes a switch 402 that is integrated in fixed relationship with a socket or plug 404. Socket or plug 404 is adapted to removably mate with socket or plug 306 on main unit 302. Switch 402 may be of any type now known or yet to be developed, including for example a momentary push-button switch.

Low voltage power button extender assembly 500 includes a switch 502 that is electrically coupled to a socket or plug 504 by a flexible cable 506. Like socket or plug 404, socket or plug 504 is adapted to removably mate with socket or plug 306 on main unit 302. Flexible cable 506 may be of any length and type compatible with the voltage and current levels that are associated with the switch sensing circuitry being employed in main unit 302.

Figure 1:
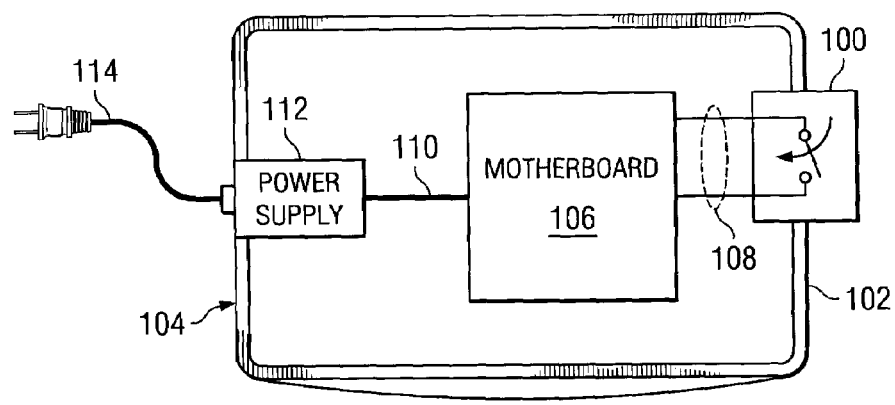
FIG. 1 is a schematic diagram of a computer having a low-voltage power button permanently mounted to the computer's enclosure at or near its exterior according to the prior art.
Figure 2:
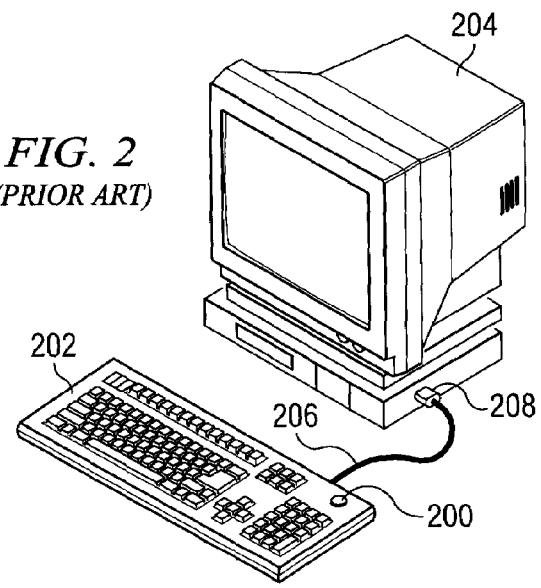
FIG. 2 is an oblique view of a computer having a low-voltage power button permanently integrated with the computer's keyboard according to the prior art.
Figure 6:
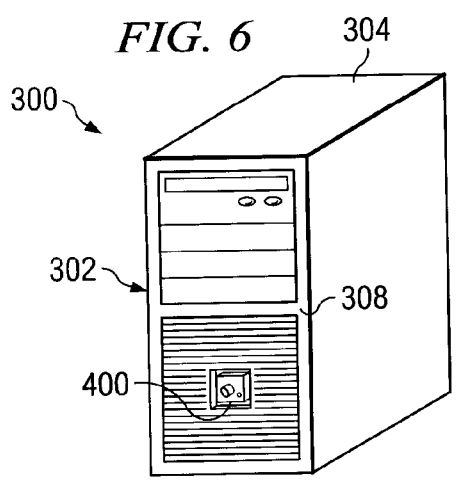
FIG. 6 is an oblique view of the computer system of FIG. 3 having the low-voltage power button of FIG. 4 installed therein.

FIG. 6 illustrates computer system 300 after low-voltage power button 400 has been installed in socket or plug 306. In this configuration, computer system 300 has a local low-voltage power button, and functions in the same manner described above in the context of FIG. 1.

Figure 7:
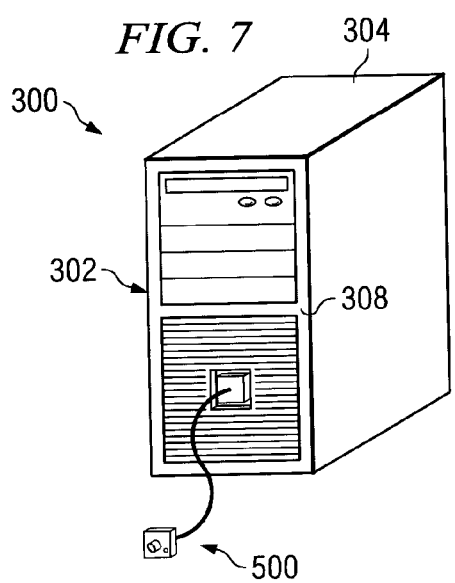
FIG. 7 is an oblique view of the computer system of FIG. 3 having the low-voltage power button extender assembly of FIG. 5 installed therein.

FIG. 7 illustrates computer system 300 after low-voltage power button 400 has been removed from socket or plug 306 and low-voltage power button extender assembly 500 has been installed in socket or plug 306. In this configuration, computer system 300 has a remote low-voltage power button.

Although in the illustrated embodiment socket or plug 306 is shown on a front surface 308 of enclosure 304, in alternative embodiments socket or plug 306 may be located on or accessible from any of the surfaces of a main unit's enclosure.

In still further embodiments, a light 406/508 may be included on a housing of switch 402/502, for example as shown. Or light 406/508 may be integrated within switch 402/502, for example underneath a translucent surface of the moving part of the switch. Light 406/508 may be operable to indicate the current power state of computer system 300 by any of the techniques known in the art or yet to be developed. If light 406/508 is not included, then cable 506 may simply comprise two conductors. If light 406/508 is included, then cable 506 may require three or more conductors, depending on the implementation. Light 406/508 may comprise any type of light source now known or yet to be developed, including for example a light-emitting diode.

What is claimed is:

1. A computer system, comprising:
   a main unit comprising an enclosure and circuitry for sensing activity in a low-voltage power button;
   a first socket or plug accessible from the exterior of the enclosure and electrically coupled to the circuitry; and
   a low-voltage power button extender assembly;
   wherein the first socket or plug is adapted to removably mate with a corresponding socket or plug of either the low-voltage power button or the low-voltage power button extender assembly, and wherein the low-voltage power button extender assembly comprises a first switch electrically coupled to a second socket or plug by a flexible cable, the second socket or plug adapted to removably mate with the first socket or plug.

2. The computer system of claim 1:
   further comprising the low-voltage power button;
   wherein the low-voltage power button comprises a second switch integrated in fixed relationship with and electrically coupled to a third socket or plug, the third socket or plug adapted to removably mate with the first socket or plug.

3. The computer system of claim 2:
   further comprising a light operable to indicate a current power state of the computer system;
   wherein the light is located on a housing of the second switch.

4. The computer system of claim 3:
   wherein the light comprises a light-emitting diode.

5. The computer system of claim 2:
   further comprising a light operable to indicate a current power state of the computer system;
   wherein the light is integrated within the second switch.

6. The computer system of claim 5:
   wherein the light comprises a light-emitting diode.

7. The computer system of claim 1:
   wherein the first socket or plug is located on a front surface of the enclosure.

8. The computer system of claim 1:
   further comprising a light operable to indicate a current power state of the computer system;
   wherein the light is located on a housing of the first switch.

9. The computer system of claim 8:
   wherein the light comprises a light-emitting diode.

10. The computer system of claim 1:
    further comprising a light operable to indicate a current power state of the computer system;
    wherein the light is integrated within the first switch.

11. The computer system of claim 10:
    wherein the light comprises a light-emitting diode.

* * * * *